HALL EFFECT ANALOG MULTIPLIERS

Filed June 12, 1968 3 Sheets-Sheet 1

INVENTORS:
Loc TA PHUOC and
Henri MONIERE
By Abraham A. Saffitz
ATTORNEY

HALL EFFECT ANALOG MULTIPLIERS

Filed June 12, 1968 3 Sheets-Sheet 2

INVENTORS:
Loc TA PHUOC and
Henri MONIERE
By Abraham A. Saffitz
ATTORNEY

HALL EFFECT ANALOG MULTIPLIERS

Filed June 12, 1968 3 Sheets-Sheet 3

INVENTORS:
Loc TA PHUOC and
Henri MONIERE
By Abraham A. Saffitz
ATTORNEY

United States Patent Office 3,523,199
Patented Aug. 4, 1970

3,523,199

HALL EFFECT ANALOG MULTIPLIERS

Loc Ta Phuoc, Palaiseau, and Henri Moniere, Joinville-le-Pont, France, assignors to Centre National de la Recherche Scientifique, Paris, France, a body corporate of France Filed June 12, 1968, Ser. No. 736,315
Int. Cl. G06g 7/16
U.S. Cl. 307—309 2 Claims

ABSTRACT OF THE DISCLOSURE

Analog Hall effect multiplier for multiplying a first and a second analog voltages comprising a semiconductor bar exhibiting a Hall effect, input electrodes and output electrodes on said bar, respectively parallel to two rectangular axes of the bar, a winding for applying a magnetic field to said semiconductor bar, two amplifiers respectively fed by the first and second analog voltages, each having at least an input stage formed by two differentially connected metal-oxide-semiconductor transistors, and an output stage formed by two field-effect transistors having their output source-drain circuits respectively connected to the input electrodes of the bar in opposite directions and to the winding in opposite directions so that the drain currents of the two transistors of the two amplifiers flow in opposite directions respectively in the semiconductor bar and the winding.

This invention relates to improvements to Hall effect analog multipliers.

It is known that when a semiconductor element with an electric current flowing through it is subjected to a magnetic field a voltage, known as the Hall voltage, is developed transversely to the general direction of the current, said voltage being proportional to the product of the flux through the element and the intensity of the current passing through it. Since the magnetic field is generally produced by passing a current through a coil, the flux is proportional to that current and the Hall voltage is proportional to the product of the two currents.

It is also known that values to be treated by analog calculation are represented by voltages, which must consequently be converted into current intensities in order to apply them to a Hall effect multiplier. The means converting voltage into current intensity in known Hall effect multipliers generally use junction transistor circuits the input impedance of which is not sufficiently high to avoid all disturbance of the voltage to be converted, while in addition one of their input terminals is connected to ground, so that these multipliers are not very suitable for impedance network computers. In particular, they do not permit the direct multiplication by one another of the derivatives of the functions represented, these derivatives being expressed by the potential difference between two points in the network.

The object of the invention is to permit an economical construction of high precision, low response time, Hall effect multipliers capable of being used particularly in iterative repetitive analog machines.

According to the invention, a Hall effect analog multiplier comprises two differential input amplifiers to which the voltages to be multiplied are respectively applied and the input stages of which comprise insulated grid field-effect transistors imparting very high input impedance to them, while their output stages make it possible to feed respectively a semiconductor element and magnetic field windings with currents the intensity of which is proportional to the input voltages and the direction of which is dependent on their polarity, together with an output differential amplifier having a very high impedance input stage and a very low impedance output stage.

Other characteristics and advantages of the invention will be seen on reading the following description and examining the accompanying drawings, in which.

Figure 1:
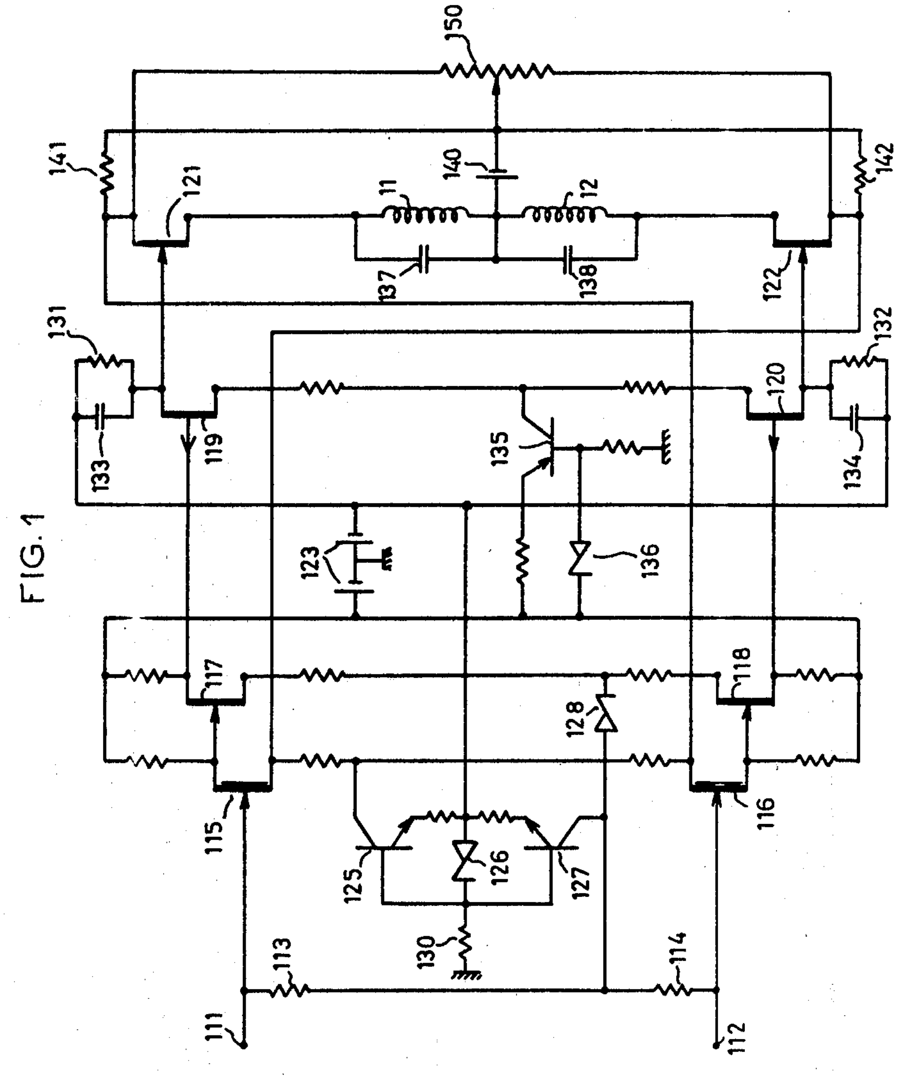
FIG. 1 is a diagram of the differential amplifier converting voltage into current feeding the field coils of a multiplier according to the invention.
Figure 2:
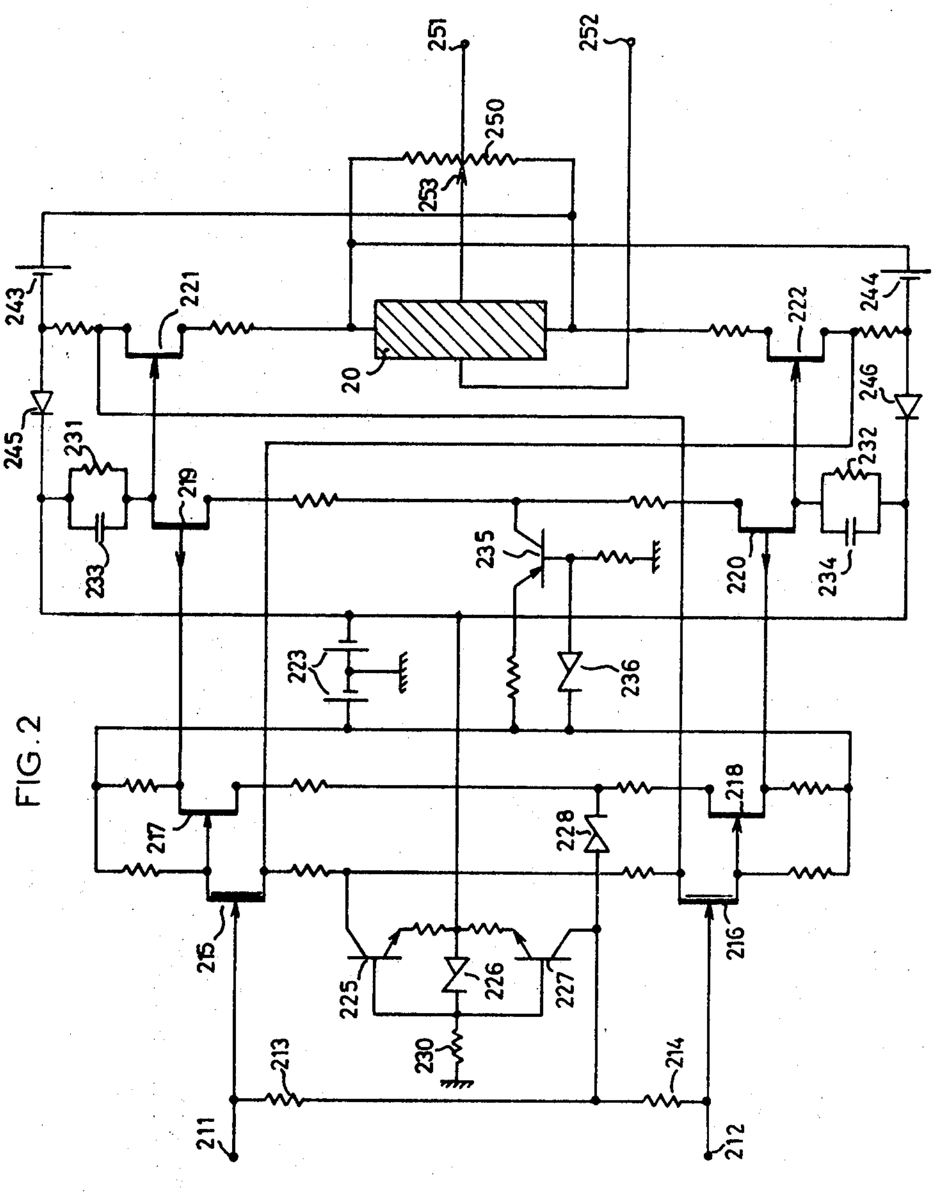
FIG. 2 illustrates the differential amplifier converting voltage into current feeding the semiconductor bar of a multiplier according to the invention.

The differential amplifiers illustrated in FIGS. 1 and 2 feed respectively the field coils 11, 12 and the semiconductor bar 20 with currents, the intensity of which is proportional to the voltage applied between their input terminals 111, 112 and 211, 212. As these two amplifiers are very similar, their corresponding elements are designated by reference numbers in which the tens and units digits correspond, and only FIG. 1 will be described in full.

The terminals 111 and 112 are connected together by two resistors 113, 114 in series and are connected respectively to the control electrode or grid of insulated grid field-effect transistors 115, 116 known under the name of M.O.S. The input impedance thus obtained is higher than 400 megohms and contributes towards reducing noise level and voltage and current drifts. The drain of the M.O.S. transistor 115, which is of the N type, is connected to the grid of a field-effect transistor 117, likewise of the N type, the drain of which is connected to the grid of a P-type field-effect transistor 119, the drain of which is in turn connected to the grid of an N-type field-effect transistor 121. The N-type M.O.S. transistor 116 symmetrically controls in cascade an N-type field-effect transistor 118, a P-type field-effect transistor 120, and an N-type field-effect transistor 122. The use of field-effect transistors for the successive stages brings about an additional reduction of voltage and current drifts.

The drain electrodes of the transistors 115, 116, 117 and 118 are connected by a resistor in each case to the positive terminal of a source 123 the centre point of which is grounded. The M.O.S. transistors 115, 116 are fed by an NPN transistor 125, the collector of which is connected by resistors to their source electrodes. The transistors 117, 118 are fed by an NPN transistor 127, the collector of which is connected by means of a Zener diode 128 and of resistors to their source electrodes. The NPN transistors 125, 127 have their bases connected together and connected to ground by a resistor 130, and their emitters connected together by two resistors in series, the common point of which is connected on the one hand to the negative terminal of the source 123 and on the other hand to the resistor 130 through a Zener diode 126 fixing their polarization voltage. In addition, the collector of the transistor 127 is connected to the common point between the resistors 113, 114, that is to say the center point between the input terminals 111, 112.

The drain electrodes of the transistors 119, 120 are connected to the negative terminal of the source 123 by means of filter circuits which are intended to eliminate noise and each of which comprises a resistor 131, 132 and a capacitor 133, 134 in parallel. The transistors 119, 120 are fed by an PNP transistor 135, the collector of which is connected to their source electrodes by resistors. The transistor 135 has its emitter connected to the positive terminal of the source 123 by a resistor and its base connected on the one hand to the same positive source by means of a Zener diode 136, and on the other hand to ground through a resistor.

The drain electrodes of the transistors 121, 122 are connected together by the series windings 11 and 12, each of which is shunted by a capacitor 137, 138 and the center point of which is connected to the positive terminal of a source 140 having a very low internal resistance. The negative terminal of the source 140 is connected to the source electrodes of the transistors 121, 122 on the one hand by polarization resistors 141, 142 and on the other hand by the two parts of a resistor 150 having an adjustable center tap permitting easy adjustment of zero. The source electrodes of the transistors 121, 122 of the output stage are in addition connected respectively to the source electrodes of the opposite M.O.S. transistors 116, 115 of the input stage. These negative feedback circuits restore to unity the gain of the arrangement, which would be higher than 10,000 with an open loop. As the input voltage varies from zero to ±10 volts, the output current varies from zero to ±50 milliamperes and the pass band is at least equal to 40 kc./s.

In FIG. 2, the drain electrodes of the transistors 221, 222 are connected by means of resistors to the two longitudinal ends of the semiconductor bar 20, which is preferably of indium arsenide because of the low magnetoresistance of that substance and of the small variation of its Hall coefficient in dependence on temperature. The end of the bar 20 which is connected to the drain of the transistor 221 is also connected to the positive terminal of a low internal resistance source 244, the negative terminal of which is connected on the one hand by a resistor to the source electrode of the transistor 222, and on the other hand through a stop diode 246 to the negative terminal of the source 223. Symmetrically, the end of the bar 20 which is connected to the drain of the transistor 222 is connected to the source of the transistor 221 by a source 243 and a series resistor, the common point of which is connected to the negative terminal of the source 223 by a stop diode 245. The side terminals of the bar 20 between which the Hall voltage appears are connected to output terminals 251, 252, direct in the case of terminal 252 and through a slider 253 in the case of terminal 251; the position of the slider is adjustable around the center of a resistor 250, the ends of which are connected to the longitudinal ends of the bar 20 in such manner as to permit correction of the residual potential difference existing between the output terminals of the bar 20 for a zero field. Since the circuits in FIG. 2 are otherwise identical to those of FIG. 1, their characteristics are the same with the exception that since the input voltage similarly varies between zero and ±10 volts, the intensity of the electric current in the bar 20 varies from zero to ±250 milliamperes.

Figure 3:
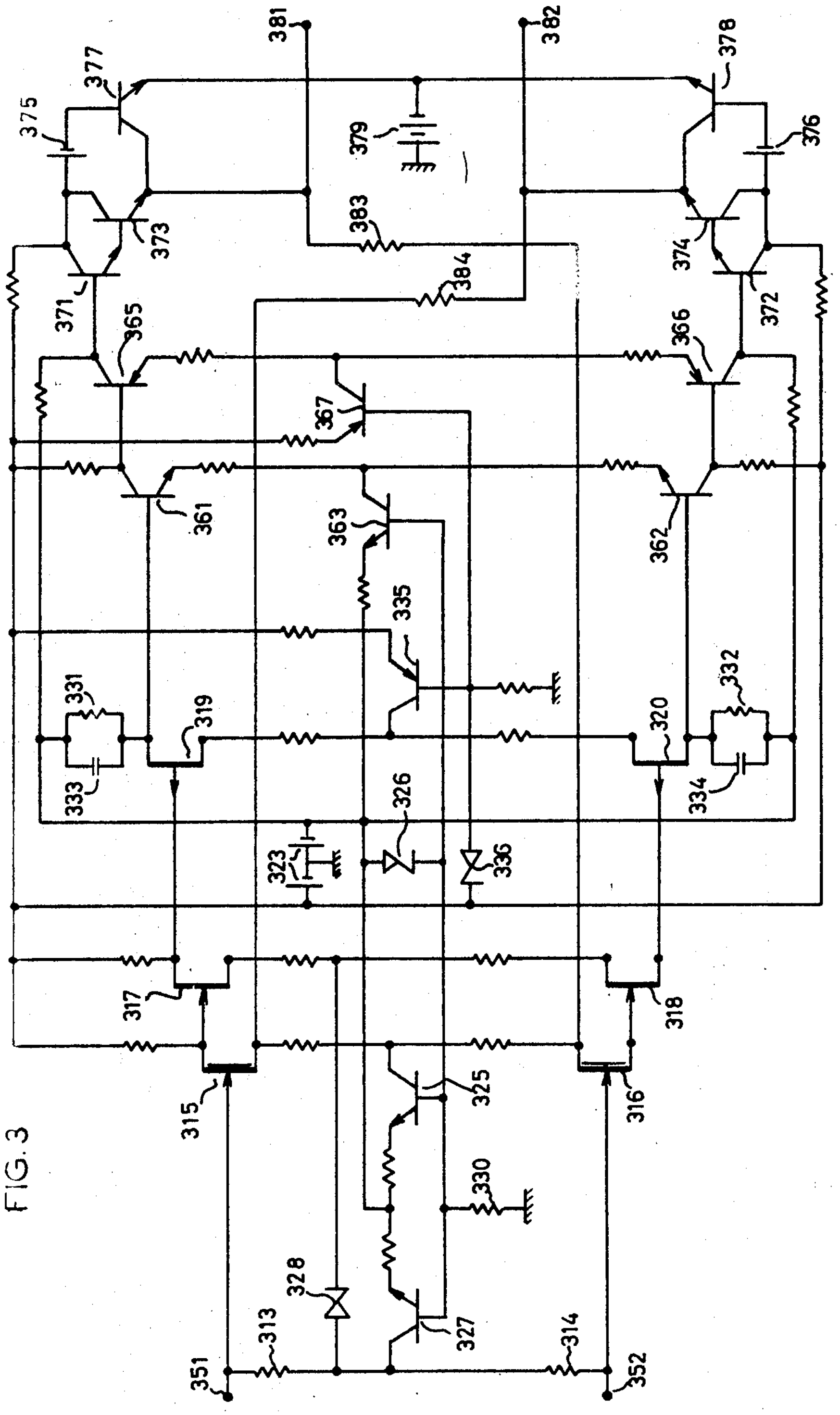
FIG. 3 is a diagram of the output amplifier of a Hall effect multiplier according to the invention.

FIG. 3 illustrates an amplifier for the Hall voltage occurring at the output terminals 251, 252 in FIG. 2. The input terminals 351, 352 of this output amplifier are connected to the terminals 251, 252 in FIG. 2, either direct or through the medium of a circuit for filtering and improving the linearity of the Hall voltage in dependence on the current and field applied. This amplifier is a continuous voltage amplifier having five stages, of which the first three are identical with the three amplification stages in FIGS. 1 and 2 and will not be described again, their elements being designated by reference numbers having the same digits for tens and units as for corresponding elements in FIGS. 1 and 2. The fourth stage of the output amplifier comprises two NPN transistors 361, 362, the bases of which are respectively connected to the drain electrodes of the transistors 319, 320, while their collectors are connected by resistors to the positive terminal of the source 323 and their emitters are connected by resistors to the collector of a feed NPN transistor 363 connected like the feed transistors 325 and 327 of the first two stages. The fifth stage of the output amplifier comprises two PNP transistors 365, 366, the bases of which are respectively connected to the collectors of the transistors 361, 362, their collectors being connected by resistors to the negative terminal of the source 323 and their emitters connected by resistors to the collector of a feed PNP transistor 367 connected like the feed transistor 335 of the third stage. The output of this amplifier passes through an impedance adaptation stage comprising two symmetrical Darlington amplifiers. The collector of the transistor 365 is connected to the base of an NPN transiostor 371, the emitter of which is connected to the base of a transistor 373, the collectors of these two transistors being connected together and on the one hand through a resistor to the positive terminal of the source 323 and on the other hand through a polarization source 375 to the base of an NPN transistor 377 the emitter of which is connected to ground by a polarization source 379, while its collector is connected to the emitter of the transistor 373 and to the output terminal 381. Symmetrically, the transistor 366 controls two transistors 372, 374 in a Darlington amplifier arrangement, with which there is associated a transistor 378 having a base polarization source 376, its emitter being connected in parallel to that of the transistor 377 to the source 379 and its collector connected to the emitter of the transistor 374 and to the output termial 382. The output terminals 381 and 382 are connected to the source electrodes of the M.O.S. transistors 316 and 315 respectively by negative feedback resistors 383 and 384, which restore to an order of magnitude of 50 or 100 the gain of the amplifier which would be at least equal to 100,000 with an open loop.

The input impedance of this output amplifier is obviously the same as that of the amplifiers in FIGS. 1 and 2, and its pass band is likewise higher than 40 kc./s. For an input voltage varying from zero to ±200 millivolts, it supplies an output voltage from zero to ±10 volts with an output impedance smaller than or equal to 0.01 ohm. It is advantageous to match the transistors occupying corresponding places in the two symmetrical chains of the circuit arrangement, and also the resistors associated with them. In addition, the emitter resistors of the feed transistors 325, 327, 335, 363, 367 are metallized resistors having a positive temperature coefficient in order to compensate for the thermal drifts of the associated transistors. The accuracy obtained in this manner is greater than one thousandth.

Of course many changes can be directed to the circuits disclosed without departing from the scope of the invention. Particularly, resistor 142 can be connected to the upper terminal of winding 11 through a current source and resistor 141 to the lower terminal of winding 12 through another current source, the current source 140 being omitted, the electric diagram for feeding the winding 11–12 being entirely similar to that for feeding the bar 20.

What we claim is:

1. Analog Hall effect multiplier for multiplying a first and a second analog voltages comprising a semiconductor bar exhibiting a Hall effect, input electrodes and output electrodes on said bar, the lines joining said input electrodes and said output electrodes being rectangular, a winding for applying a magnetic field to said semiconductor bar, a first amplifier fed by said first analog voltage having at least an input stage formed by two differentially connected metal-oxyde-semiconductor transistors, and an output stage formed by two field-effect transistors having their output source-drain circuits respectively connected to the input electrodes of the bar in opposite directions, whereby the drain currents of said two latter field-effect transistors flow in opposite directions through the bar, and a second amplifier fed by said second analog voltage having at least an input stage formed by two differentially connected metal-oxyde-semiconductor transistors and an output stage formed by two field-effect transistors having their output source-drain circuits respectively connected to the winding in opposite directions, whereby the drain currents of said latter field-effect transistors flow in opposite directions through the winding.

2. Analog Hall effect multiplier for multiplying a first and a second analog voltages comprising a semiconductor bar exhibiting a Hall effect, input electrodes and output electrodes on said bar, the lines joining said input electrodes and said output electrodes being rectangular, a winding for applying a magnetic field to said semiconductor bar, said winding being divided into two half-windings, a first amplifier fed by said first analog voltage having at least an input stage formed by two differentially connected metal-oxyde-semiconductor transistors, and an output stage formed by two field-effect transistors having their output source-drain circuits respectively connected to the input electrodes of the bar in opposite directions, whereby the drain currents of said two latter field-effect transistors flow in opposite directions through the bar, and a second amplifier fed by said second analog voltage having at least an input stage formed by two differentially connected metal-oxyde-semiconductor transistors and an output stage formed by two field-effect transistors having their output source-drain circuits respectively connected to the half-windings in opposite directions through a common supply source.

References Cited

UNITED STATES PATENTS

| | | | |
|---|---|---|---|
| 3,335,358 | 8/1967 | Schultz | 307—309 X |
| 3,431,435 | 3/1969 | Bizet | 307—309 X |

JOHN S. HEYMAN, Primary Examiner

U.S. Cl. X.R.

328—160